United States Patent
Sharma et al.

(10) Patent No.: US 11,126,423 B2
(45) Date of Patent: Sep. 21, 2021

(54) ENTERPRISE FIRMWARE MANAGEMENT

(71) Applicant: VMware, Inc., Palo Alto, CA (US)

(72) Inventors: Kashyap Kumar Sharma, Bangalore (IN); Lokeswar Akuthota, Bangalore (IN); Eric Matthew Stillman, Atlanta, GA (US); Daniel Benjamin Quintas, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/851,489

(22) Filed: Apr. 17, 2020

(65) Prior Publication Data

US 2020/0241871 A1    Jul. 30, 2020

Related U.S. Application Data

(63) Continuation of application No. 15/936,482, filed on Mar. 27, 2018, now Pat. No. 10,628,149.

(30) Foreign Application Priority Data

Feb. 5, 2018    (IN) .............................. 201841004208

(51) Int. Cl.
*G06F 8/65* (2018.01)
*G06F 8/71* (2018.01)
(Continued)

(52) U.S. Cl.
CPC .................. *G06F 8/65* (2013.01); *G06F 8/71* (2013.01); *G06F 21/572* (2013.01); *H04L 67/303* (2013.01); *H04L 67/34* (2013.01)

(58) Field of Classification Search
None
See application file for complete search history.

(56) References Cited

U.S. PATENT DOCUMENTS 8,433,310 B2 * 4/2013 Kalke ............... H04M 3/42178
                                                                455/419
8,589,910 B2 * 11/2013 Zubas ..................... G06F 8/654
                                                                717/173

(Continued)

OTHER PUBLICATIONS

Samsung, "Enterprise Firmware Over-The-Air", 2016, Samsung at https://seap.samsung.com/sdk/enterprise-fota (Year: 2016).*

(Continued)

*Primary Examiner* — Hossain M Morshed
(74) *Attorney, Agent, or Firm* — Clayton, McKay & Bailey, PC (57) ABSTRACT

Examples described herein include systems and methods managing firmware versions of user devices that are enrolled in an enterprise mobility management system. The system can include a management server that sends profiles to enrolled devices, causing those devices to restrict further firmware updates and register with a firmware server. The management server can retrieve available firmware versions and display those in a console. An administrator can select target firmware versions in the console. The management server can the cause the enrolled devices to update to the target firmware versions. This can include sending a call from the management server to the firmware server, causing an automatic update. It can also include sending a command from the management server to an enrolled device, causing the enrolled device to prompt a user prior to requesting a firmware update. This can allow an administrator to prevent user devices from installing firmware updates that could expose the enterprise to security risks or negatively impact operation of enterprise applications.

20 Claims, 6 Drawing Sheets

(51) Int. Cl.
    H04L 29/08      (2006.01)
    G06F 21/57      (2013.01)

(56) References Cited

U.S. PATENT DOCUMENTS

| | | | | |
|---|---|---|---|---|
| 8,868,696 | B2* | 10/2014 | Lewis | H04W 8/245 |
| | | | | 709/220 |
| 9,392,077 | B2* | 7/2016 | Borzycki | H04L 1/0025 |
| 9,584,949 | B2* | 2/2017 | Korovin | H04W 4/60 |
| 9,894,066 | B2* | 2/2018 | Conrad | H04W 12/08 |
| 10,064,055 | B2* | 8/2018 | Raleigh | G06F 8/65 |
| 2012/0216242 | A1* | 8/2012 | Uner | G06F 21/50 |
| | | | | 726/1 |
| 2013/0111461 | A1* | 5/2013 | Zubas | G06F 8/654 |
| | | | | 717/173 |
| 2014/0148194 | A1* | 5/2014 | Ahn | H04W 64/00 |
| | | | | 455/456.1 |
| 2015/0067667 | A1* | 3/2015 | Chan | H04L 67/1095 |
| | | | | 717/169 |
| 2016/0170772 | A1* | 6/2016 | Krishnamurthy | G06F 1/3287 |
| | | | | 713/100 |
| 2019/0243631 | A1* | 8/2019 | Sharma | G06F 21/572 |

OTHER PUBLICATIONS

Samsung, "Enterprise Firmware Over-The-Air", 2016, Samsung (Year: 2016).*

"Enterprise Firmware Over-The Air", Samsung, https://seap.samsung.com/sdk/enterprise-fota, 2016.

"Mobile device management (MDM) for device updates", Alforque, https://docs.microsoft.com/en-us/windows/client-management/mdm/device-update-management, 2017.

* cited by examiner

ENTERPRISE FIRMWARE MANAGEMENT

RELATED APPLICATIONS

This application is a continuation of application Ser. No. 15/936,482 entitled "ENTERPRISE FIRMWARE MANAGEMENT", filed Mar. 27, 2018, which claims the benefit of priority under 35 U.S.C. 1 19(a)-(d) to Foreign Application Serial No. 201841004208 filed in India entitled "ENTERPRISE FIRMWARE MANAGEMENT", on Feb. 5, 2018, by VMware, Inc., both of which are herein incorporated by reference in their entireties for all purposes.

BACKGROUND

Enterprises increasingly rely on Mobile Device Management ("MDM") or Enterprise Mobility Management ("EMM") providers to help manage devices for employees. Device-management systems allow an enterprise to exercise varying levels of control over devices, even when those devices are employee-owned. Enrolling a device into a device-management system can involve installing management software on the device that allows an administrator to monitor the device and enforce policies and compliance rules. Enrollment can also include leveraging EMM functionality built into an operating system ("OS") of a device.

However, devices are constantly receiving firmware updates. Sometimes these updates can be disruptive in the enterprise environment. When new firmware is released, it can include exploitable bugs or can unintentionally alter device functionality. For example, new firmware can cause incompatibility with an enterprise application. Also, EMM functionality may need to be tailored differently based on firmware and OS differences between devices. Similarly, if a device allows a user to reject firmware updates, critical security patches can be missing. This can leave an enterprise at risk when enterprise data is accessed by a user device that is missing a security patch. User choices in applying firmware updates can result in a variety of different firmware versions across even the same device models in an EMM system.

An enterprise typically has no control over firmware releases. IT administrators have no way of keeping the installed versions uniform and predictable. Instead, firmware updates are usually pushed automatically to devices and are carrier controlled. When devices update themselves, the enterprise faces potential functionality and compatibility conflicts. Administrators need time to verify new firmware does not introduce flaws in the EMM system. Without control over the firmware updates, an enterprise must constantly react to firmware updates without knowing the true impact of the update in advance.

As a result, a need exists for systems and methods for managing firmware versions on user devices.

SUMMARY

Examples described herein include systems and methods for managing firmware versions on user devices. In one example, a management server can monitor available firmware updates across devices as part of an EMM system. Enrolled devices can register for management of firmware updates, and the management server can specify a target firmware version for the enrolled devices to install based on selections by an administrator in a management console. The system can allow the enterprise or EMM provider to test firmware updates by allowing them to select a group of devices within the enterprise to receive a particular firmware version. This allows the enterprise to resolve incompatibility issues before the firmware version is installed across all devices. Additionally, by managing firmware versions for devices enrolled in the EMM system, some intermediate firmware updates can be skipped, and the management server can also force critical security updates that require a particular firmware version.

In one example, the management server can register with a firmware server to enable firmware management at the firmware server. The firmware server can approve the registration, and send a credential, such as a token, to the management server for use in communicating with the firmware server. The credential can be based on one or more identifiers or passwords, such as a secret passkey or customer identifier.

Once the management server has registered with the firmware server, the management server can send a profile to an enrolled device to restrict firmware updates. The profile can cause the enrolled device to disable further firmware updates without administrative approval. For example, the profile can specify that the current firmware version is the target firmware version. In one example, a management agent executing on the enrolled device reads the profile. The management agent can pre-exist as part of the OS or can be installed as part of enrollment in the EMM system. The management agent can disable firmware updates as specified in the profile. This can cause the enrolled device to stop checking with the firmware server for updates without authorization from the management server to do so.

The profile or other command from the management server can also cause the enrolled device to register with the firmware server. To register, the enrolled device can make an application programming interface ("API") call to the firmware server. The profile can specify the API call and the address of the firmware server, in an example. The API call can also use the credential received by the management server from the firmware server, allowing the firmware server to determine which customer or EMM system the registering device is associated with. The firmware server can be associated with any device manufacturer, OEM, supplier, or carrier. For example, the firmware server can include a SAMSUNG enterprise portal. To communicate with the firmware server, the management server can use a client identifier and password. This information can be provided ahead of time by the firmware supplier.

In one example, the system can also display a console that allows an administrator to specify target firmware versions for installation on enrolled devices. The console can list firmware versions for different device manufacturers, device models, and carriers. The listed firmware versions can be based on which device models are enrolled with the management server. The management server can use these device models, which can be reported during enrollment, to request identification of corresponding firmware versions from the firmware server(s) associated with those device models.

Using the console, an administrator can select which firmware versions to target for installation on some or all of the enrolled devices. For example, an administrator can use a console to specify a maximum firmware version or a specific firmware version for devices belonging to a particular carrier or OEM, such as SAMSUNG or APPLE. The target firmware version can be a specific version of firmware, a whitelist of accepted firmware versions, or a maximum or minimum firmware version, depending on the example. In one example, the administrator can select a maximum OS build to install on an enrolled device. When the OS build is released, a corresponding firmware version can be installed.

The management agent executing on the enrolled devices can report current firmware versions. Based on this information, the management server can stage firmware updates. If the management server determines a first device does not have the target firmware version, the management server can send a command to update the firmware. The console can also allow an administrator to select a firmware delivery method. For example, an administrator can specify whether to install the firmware automatically or on demand. If automatic, the management agent can install firmware updates without further user input at a specified date and time or as soon as the management agent receives the profile. If on demand, the management agent can require the user of the first device to accept firmware updates before they are installed on the first device.

For an automatic update, the management server can make an API call to the firmware server using the stored credential, identifying the enrolled device(s), and identifying the target firmware version. The API call can also specify a target installation date and time. This can cause the firmware server to push the target firmware version to the identified enrolled device(s) at the scheduled date and time. In one example, the first device reports the newly installed firmware version to the management server. This allows the management server to update the console to maintain an accurate record of current firmware versions across enrolled devices.

For an on-demand update, the management server can send a command to the enrolled device(s) by communicating with the management agent. The command can be part of the profile or a subsequently sent profile, in one example. The management agent can cause the computing device to display a notification on the device regarding the firmware update. The user can then approve the update. Upon approval, the user device contacts the firmware server and receives the firmware update. The management agent can then report the new firmware version to the management server.

The examples summarized above can each be incorporated into a non-transitory, computer-readable medium having instructions that, when executed by a processor associated with a computing device, cause the processor to perform stages for managing firmware on a group of user devices enrolled in an EMM system. It can also be implemented in a system or as a method executed by one or more processors.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for controlling firmware installation on devices that are enrolled in an EMM system. The system can allow an EMM customer to manage over-the-air ("OTA") firmware updates on enrolled user devices, including firmware version control and firmware update scheduling. This is also referred to as enterprise firmware over-the-air ("EFOTA") management.

Figure 1:
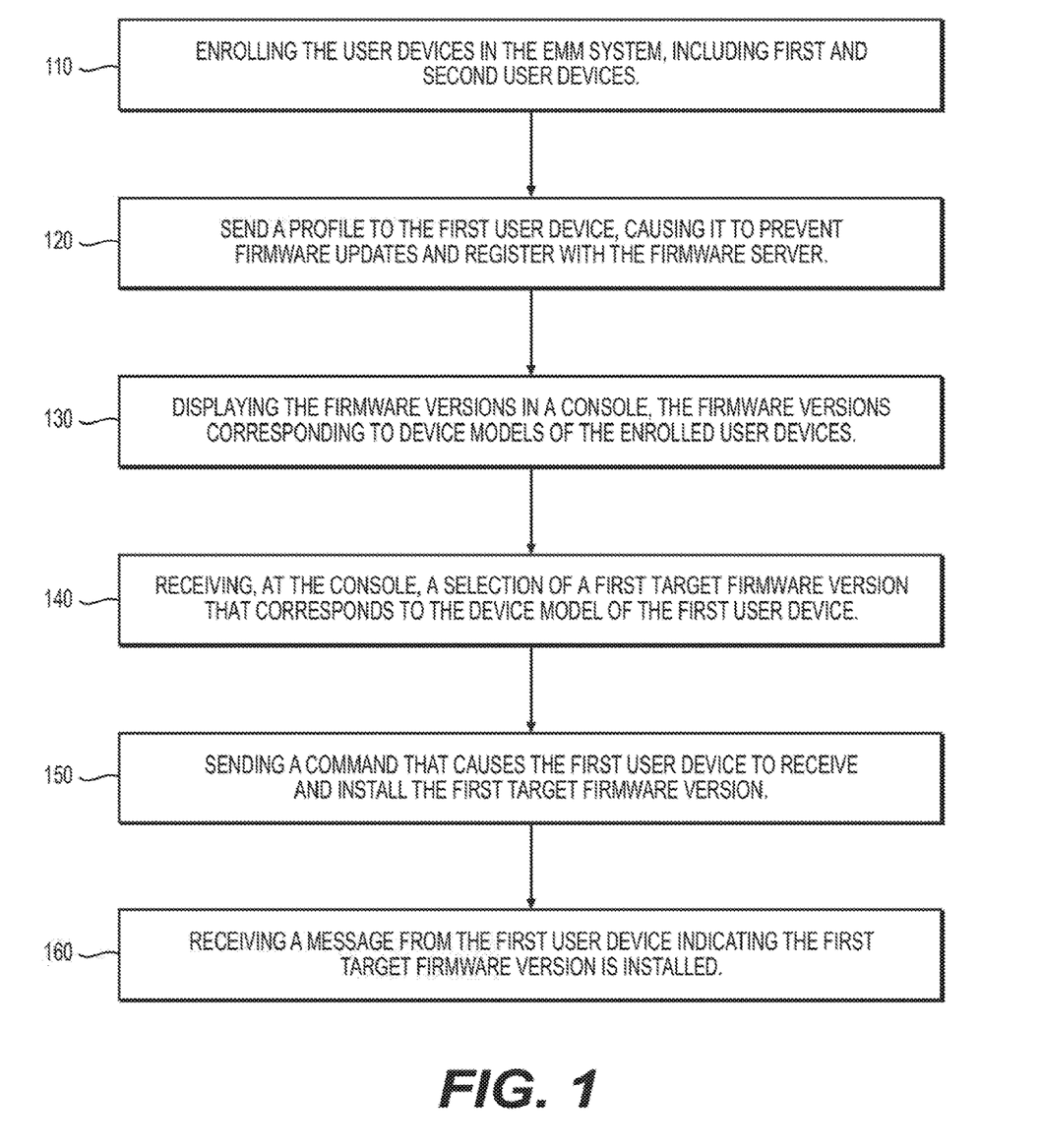
FIG. 1 is a flowchart of an exemplary method for managing firmware of a group of user devices associated with an enterprise.

FIG. 1 is an example method for EFOTA management. At stage 110, a management server can enroll devices into the EMM system. The devices can be any processor-based computing devices, such as phones, tablets, or laptops. Enrolling into an EMM system can allow a user to bring their own device to work and use it for enterprise purposes. For example, a user can access enterprise applications and data on their own device after enrollment. Enrolling can provide an enterprise with management functionality that ensures the enterprise data is not compromised on the enrolled device.

During enrollment, a management server can receive device information about the enrolling computing device, such as a device model and current firmware version. The device model can indicate a particular make of the computing device. The device model can also indicate the source of the computing device, such as the manufacturer, OEM, carrier, or firmware supplier of a device. In one example, the management server identifies an applicable firmware server for an enrolled device by receiving the device model and linking that to a firmware server in a database.

The enrolled devices can be associated with a customer. For example, an EMM provider can allow multiple customers to manage the user devices in their respective enterprise. In one example, the management server can register the customer for EFOTA management at a firmware server. This can include requesting EFOTA management and receiving an acceptance from the firmware server. As part of the registration, the firmware server can send a credential for use in communicating with the firmware server. The credential can be a token, certificate, passphrase, or other credential. A device communicating using the credential can allow the firmware server to recognize which EMM system and customer the device is associated with.

At stage 120, the management server can send a profile to an enrolled device that causes the enrolled device to prevent firmware updates and register with the firmware server. The profile can include one or more commands for execution by the enrolled device. In an example, commands in the profile can cause the device to restrict itself from further firmware updates without administrative approval. A management agent executing on the device can cause the device to impose this restriction. The management agent can be included as part of EMM functionality provided with the operating system. In that example, the management agent can pre-exist prior to enrollment. However, in another example, the management agent is installed on the device as part of enrollment with the management server.

The profile can also include a registration call to the firmware server. The management agent can cause the device to contact the firmware server to register itself for receiving EFOTA managed firmware updates from the firmware server. The registration call included in the profile can include an API call specific to the firmware server. The profile can also include the credential received by the management server as part of registering the customer EFOTA management. The device can use the credential to register itself with the firmware server, allowing the firmware server to associate the device with the customer and management server.

In one example, the profile contains a restriction payload in XML that contains a corporate identifier and a flag that enables or disables EFOTA. For example, the payload can be formatted as "(<parm name="AllowEfotaRegistration" value="True/False"/><parm name='EfotaCorpId'value='xxxxxxxxx'/>)." The management agent, upon reading the payload, can make an API call to the firmware server, such as setAllowedFOTAVersion( ) with the EfotaCorpId parameter and target firmware version as its existing firmware version. This can lock the device into its current firmware version.

At stage 130, the management server can provide a console that allows an administrator to control firmware updates for enrolled devices. The console can display firmware versions corresponding to device models of the enrolled user devices. For example, the management server can determine a set of device models belonging to enrolled devices for a particular customer. This information can be reported initially as part of enrollment, and on an ongoing basis by the management agent. Similarly, the enrolled device can report its OS version to the management server.

The management server can use the device model or OS to identify corresponding firmware servers, such as by using a lookup table that correlates firmware servers to device models and OS versions. The management server can send a list request to the corresponding firmware servers. The list request can include one or more device models or OS versions. In response, each firmware server can identify to the management server the various firmware versions available at the firmware server. The identified firmware versions can also include upcoming releases, in an example. This can allow the console to display the available firmware versions corresponding to one or more of the enrolled devices.

At stage 140, the management server can receive, at the console, a selection of a first target firmware version that corresponds to the device model of the first user device. An administrative user can select various firmware versions for approval, marking those as target firmware versions. A target firmware version can identify a single firmware version in one example. Alternatively, it can identify a range of firmware versions. For example, it can set a maximum or minimum firmware version, or can set maximum or minimum firmware publication dates. In that example, the selection at the console can include checking multiple different approved firmware versions. Alternatively, it can include selecting a date range of acceptable firmware versions.

The target firmware version can be selected for individual devices or groups of devices. For example, an administrator can make target firmware selections for entire OS versions or device models. In another example, the administrator can make target firmware selections for organizational groups. For example, software developers can be restricted to different firmware versions than executives. In still another example, the group can be based on office location, geographic region, or simply based on a test group that includes members across different offices and organizational groups of the enterprise. Using groups, the administrator can rollout a target firmware version to a small subset of devices before allowing all the enrolled devices to implement the firmware. A staged firmware rollout can allow the enterprise to catch issues on a much less widespread basis, increasing the likelihood that a firmware update will not cause sweeping issues across the enterprise.

Once a target firmware version has been selected for a group, the management server can determine which enrolled devices in that group are not already running the target firmware version. This involves comparing firmware versions reported by the management agent of the enrolled devices in the group to the target firmware versions. When the target firmware version is a list or range of different approved firmware versions, the management server can compare the reported firmware versions against the list or range. Devices that are not in compliance with the target firmware version are then flagged, queued, or scheduled for update.

In the example of FIG. 1, a first user device can be identified for update. The management server can make this identification based on the first user device belonging to a group that has received a target firmware version selection at the console, and the first user device reporting a firmware version that does not meet the target firmware version.

At stage 150, the management server can send a command that causes the first user device to receive and install the first target firmware version. The command can be in JSON format in one example. The command can include a target firmware version, a carrier code, a corporate identifier, a current firmware version, and indicate the device model. For example, the command can include the following format: {"AppliedFotaVersion":G955USQU1AQC9/ G955UOYN1AQC9/G955USQU1AQC9, "CarrierCode": "INS", "CorpID":"APQ78WONYC", "CurrentFrameworkVersion": G955USQU1AQC9, "DeviceModelName": SM-G925I}. Another example format is provided in Table 1, below, although the format can vary based on the API of the firmware server.

TABLE 1

| DeviceID | ModelNumber | CarrierCode | TargetFirmware | CurrFirmware | CorpID |
| --- | --- | --- | --- | --- | --- |

This command can be sent to either the user device for interrogation by the management agent with the firmware server, or directly to the firmware server. This can depend on whether the management server is configured for on-demand or automatic updates for the first user device. An on-demand update can allow a user at the first user device to authorize or otherwise decide when the firmware update will take place. An automatic update can remove the authorization step and instead cause the firmware server to push the target firmware version to the first user device for installation immediately or at a scheduled time in the future.

At stage 150, the management server can send the command to the first user device for an on-demand update, or, alternatively, can send the command to the firmware server for an automatic update. For an automatic update, the management server can send an API call to the firmware server. The API call can include the credential received from the firmware server as part of the management server registering with the firmware server. The API call can also identify the target firmware version and the first user device to the firmware server. The first user device can be identified as part of multiple user devices or a group of user devices, in an example. Because the first user device is already registered with the firmware server, the firmware server is able to communicate directly with the first user device based on the management server identifying that device.

The firmware server can then contact the first user device, sending the automatic firmware update to the first user device and other enrolled devices. The firmware server can use credentials or other information stored at the firmware server to negotiate with the first user device. Upon receiving the target firmware version, the management agent executing on the first user device can cause the device to install the target firmware version and restart itself.

Alternatively, the management server can send an updated profile to the user device that includes the target firmware version. This can cause the user device to contact the firmware server to request the target firmware version. The user device can prompt the user before doing so in an example. This can allow a user to schedule when the firmware is installed. If the user is using the first user device, the user can temporarily decline installation of the firmware until a later time or until prompted again.

At stage 160, the first user device can report its current firmware version to the management server. The management agent can report that the target firmware version is currently installed and operational. The management server can receive this communication and update records stored at the management server to reflect the current firmware version of the first user device. In this way, the management server can track current firmware versions of all enrolled devices, and manage future firmware updates accordingly.

Figure 2:
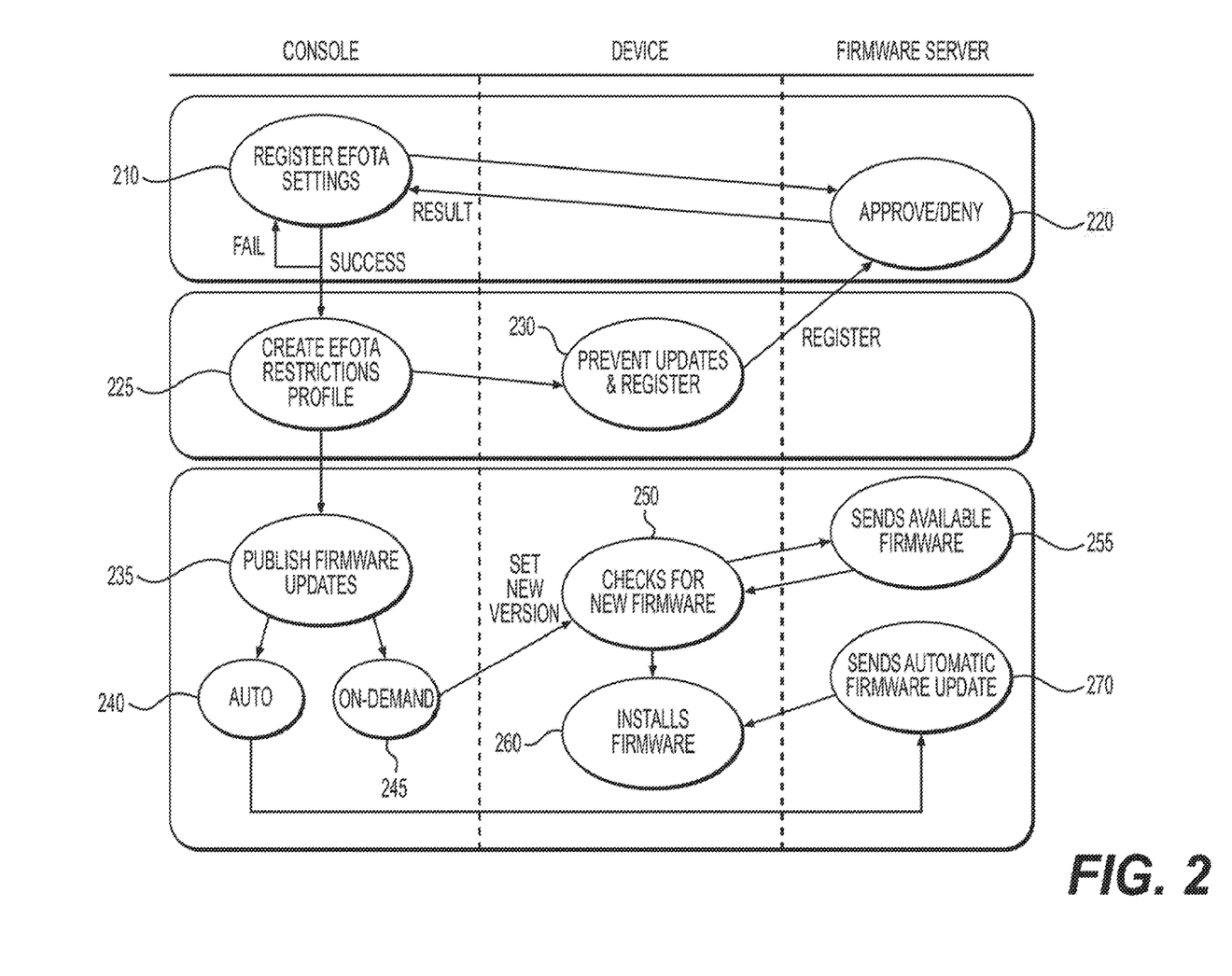
FIG. 2 is a flowchart of an exemplary method for managing firmware of a group of user devices associated with an enterprise.

FIG. 2 is an example flowchart with stages performed between a console, device, and firmware server. At stage 210, an administrator can use the console to register EFOTA settings at a firmware server. In the console, the administrator can supply credentials needed to register. The credentials can include a secret authentication credential, such as a password, known at the firmware server. The secret authentication credential can be used to access the firmware server API. The credentials can also include an EMM identifier that identifies an EMM provider and a customer identifier that identifies a customer of the EMM provider. The credentials can be sent to the firmware server as part of a registration request.

Based on these credentials, the firmware server can approve or deny the registration request at stage 220. If the request is approved, the firmware server can return a management credential to the management server for use in future communications between the management server and the firmware server. The management credential can be a public key that is used to encrypt communications that are decrypted by a private key at the firmware server. The management credentials can also include a unique identifier that allows the firmware server to identify the management server, EMM provider, EMM customer, or group belonging to the EMM customer.

If registration fails, the console can prompt the administrator to try again. Otherwise, the console can indicate a successful registration.

At stage 225, the administrator can create an EFOTA restrictions profile. This can be a profile that blocks enrolled devices from updating firmware without authorization from the management server. In one example, the profile blocks firmware updates by setting the device's current firmware version as the maximum firmware version allowed on the device. Until the management server updates the profile or sends a command to the user device, the device will not upgrade its firmware. The profile can also contain an instruction and address for registering with the firmware server.

The administrator can create the profile for a single enrolled device or a group of devices. The group can be any group of enrolled devices that are registered for EFOTA. For example, the administrator can select a group representing all enrolled devices of a particular device model or running a particular OS. Alternatively, the group can be an organizational group, such as an executive group. In still another example, the group can represent an early updater group that includes devices identified by the EMM provider or enterprise for testing new firmware releases.

In one example, the profile is initially created when the group of devices is registered for EFOTA. A screen in the console can allow the administrator to select enrolled devices for which EFOTA will be enabled. The management server can track the current firmware versions of the enrolled devices based on reports received during or after enrollment from the management agent. In an example, the original profile can specify the device's current firmware version as the target firmware version, preventing any firmware changes from occurring. The profile can be updated by a command from the management server indicating a new target firmware version. Alternatively, the first profile sent can include a different target firmware version than currently employed by the user device.

The administrator can identify a target firmware version by selecting one or more firmware versions. The target firmware version can represent a single firmware version selected by the administrator. Alternatively, the administrator can select multiple firmware versions individually or by choosing a range of firmware versions or dates. The range can be a maximum or minimum of a firmware version or firmware release date. In another example, the administrator can select firmware versions to exclude from installation on the enrolled devices, creating a blacklist. In that example, the management agent can block installation of the blacklisted firmware versions.

The management server can send the new or updated profile to the single user device or group of user devices at stage 230. The management agent can read the profile and cause the user device to contact the firmware server. The profile can include an address, such as a uniform resource locator ("URL"), to contact to reach the firmware server. The profile can also include credentials to use when communicating with the firmware server, and can specify a device identifier to use so that the firmware server can identify the enrolled device. The credential can be provided in the profile from the management server, and can be one of the credentials received by the management server from the firmware server as part of registration at stage 220. The identifier can be included as part of the URL, as can the credentials.

The firmware server can approve or deny the registration requests of the devices at stage 220. Using the credential, the firmware server can identify the EMM provider, EMM customer, or group associated with the user device.

At stage 235, the console can publish firmware updates to devices based on selections at the console. The timing can be immediate, staged, or based on a scheduled future date and time. This can include sending a command to either the enrolled device or the firmware server, depending on the example.

In a first example, the administrator has selected to provide automatic firmware updates at stage 240. In response, the management server can send a command to the firmware server. The command can use the credential received at stage 220. The command can also identify a first user device, which the firmware server can recognize based on the first user device's prior registration, which previously provided the device identifier. The command can also identify the target firmware version.

Based on the command, at stage 270 the firmware server can automatically push the target firmware version to the first user device. This can include contacting the first user device and negotiating based on the credentials exchanged when the first user device registered with the firmware server. Once the target firmware version is downloaded, the management agent or OS can install the firmware at stage 260.

In another example, it is also possible for automatic updates to be performed by sending a command to the device instead of the firmware server. The management agent can receive the command and fetch the target firmware version.

Alternatively, the administrator can choose an option for on-demand firmware updates at stage 245. In that case, the command can be sent from the management server to the first user device. The command can include the target firmware version and cause the management agent to update the target firmware version, in an example. It can also include an updated profile in another example. The command can cause the user device to check for firmware that meets the target firmware version, in an example. However, the user device can prompt the user before allowing the target firmware version to be installed.

If the user confirms, then the user device can contact the firmware server to retrieve available firmware that meets the target firmware version at stage 250. The management agent can use the URL from the profile and the stored credential from registration. The target firmware version can also be supplied by the user device, in an example.

At stage 255, if available firmware meets the target firmware version, the firmware server can send the firmware to the first user device for installation. The management server can install it at stage 260, after the user has authorized the installation.

Figure 3A:
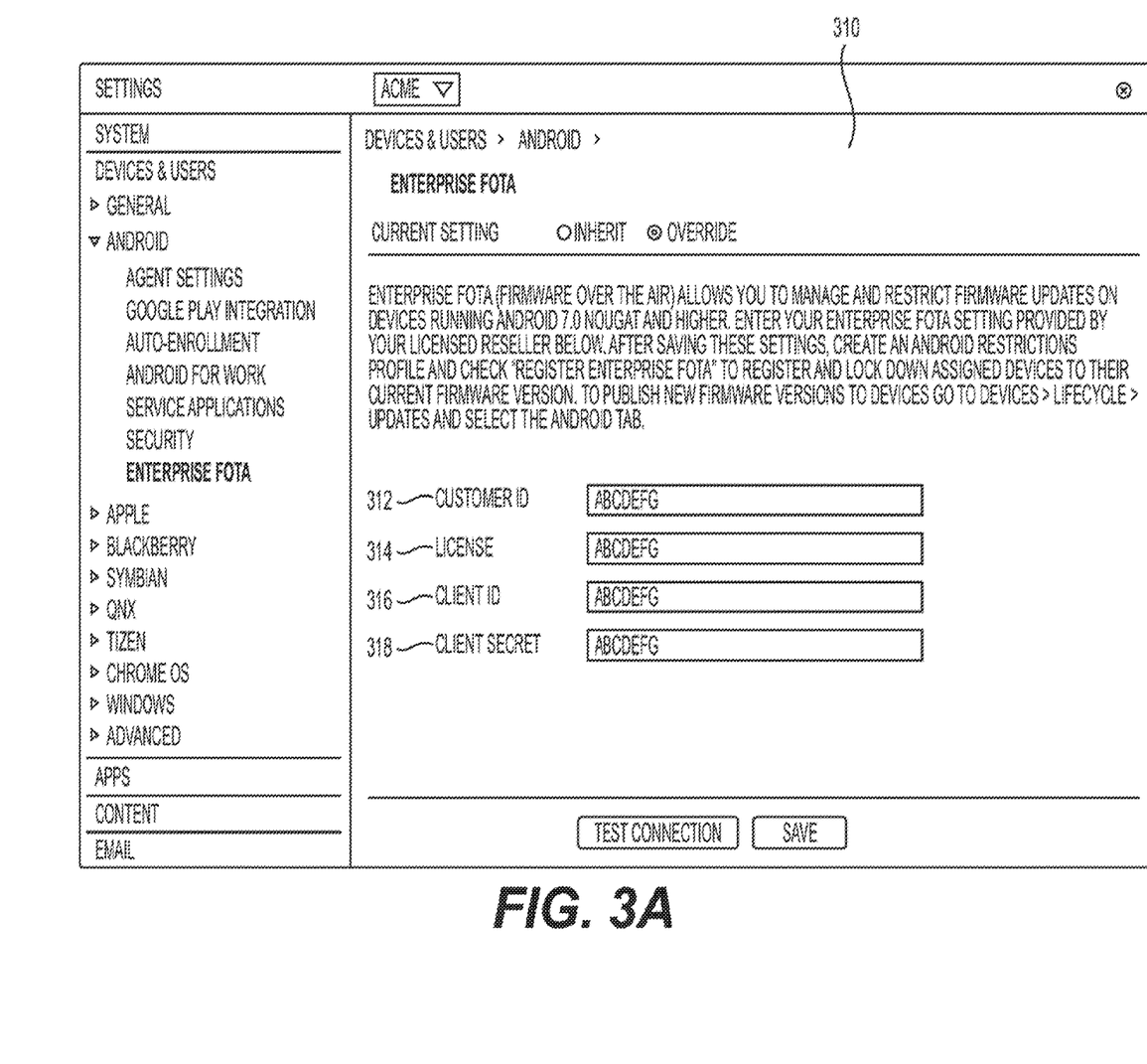
FIG. 3A is an exemplary illustration of a console graphical user interface ("GUI") for use in managing firmware for a group of user devices.

FIG. 3A is an example GUI that can be presented for registering an EMM system, provider, and customer with a firmware server. In one example, this screen 310 is part of the console. EFOTA registration can be one of several settings available at the console of the management server. For example, the console can also allow an administrator to specify compliance settings and to assign users or user devices to groups within the enterprise. The screen 310 can allow the administrator to enter various information needed to register for EFOTA at the firmware server. In another example, screen 310 can be accessed at a web server associated with the firmware server.

In example screen 310, the administrator can supply a customer identifier 312. The customer identifier 312 can be provided by the firmware provider and identify the customer that is registering, such as the EMM provider. The administrator can also enter a license 314, which can correspond to a license provided by the firmware provider. The firmware provider can be a device manufacturer, OS provider, or OEM, such as SAMSUNG, GOOGLE, or APPLE.

The console can also accept a client identifier 316 and client secret 318. These identifiers can be provided by the firmware provider for purposes of receiving an authentication token from the firmware server. These identifiers can act as passwords at the firmware server. The client secret 318 can be a password needed to access the firmware server API. In one example, the button "test connection" can be used to validate the client identifier 316 and client secret 318.

When the "save" button is selected, the management server can attempt to register with the firmware server. In return for validating the information 312, 314, 316, and 318 entered by the administrator, the firmware server can return an authentication credential for use by the management server for communicating with the firmware server. This can include a password. It can also include a token, such as an OAuth token. In one example, the authentication credential is created based on information in the customer identifier 312 and client secret 318.

Figure 3B:
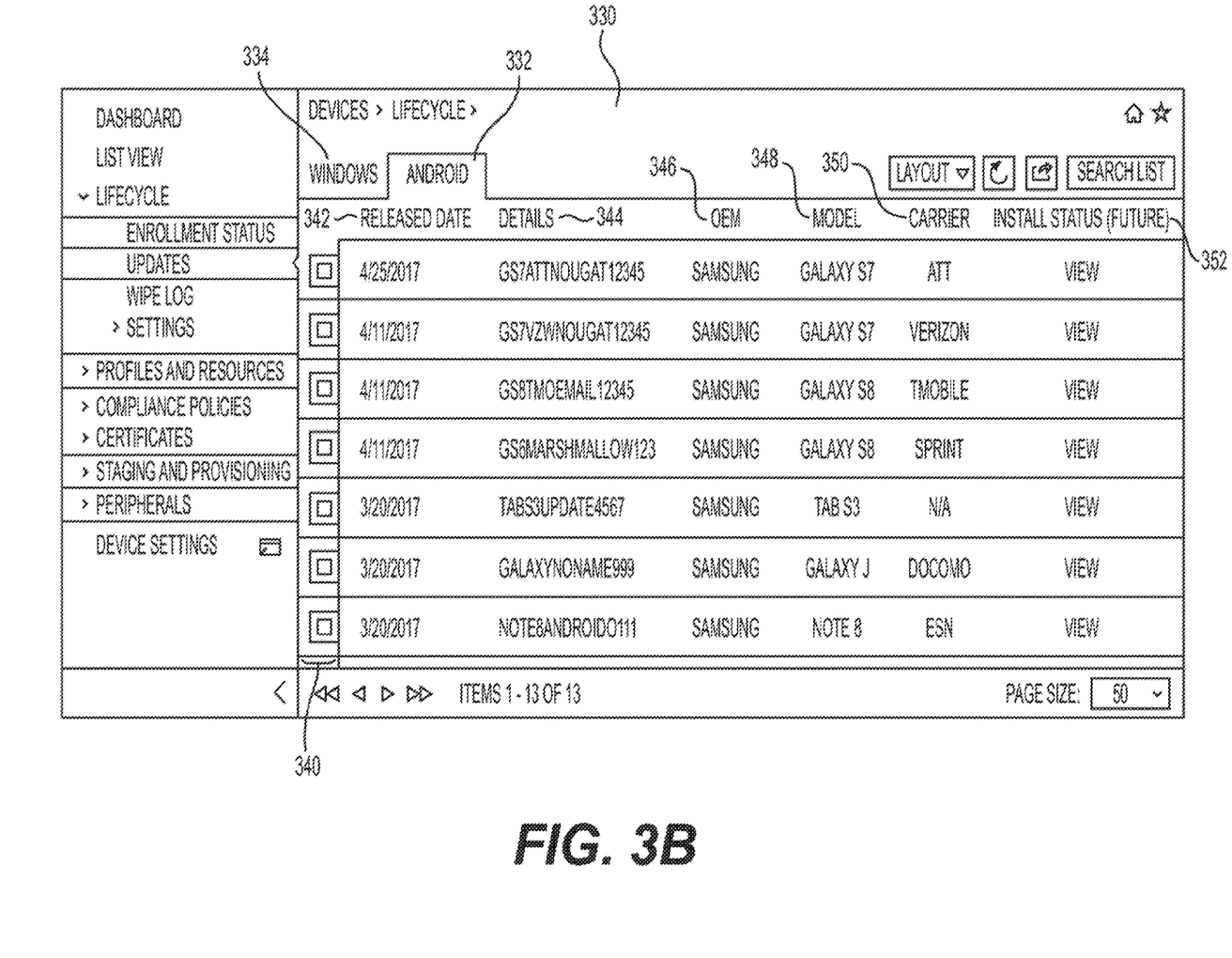
FIG. 3B is an exemplary illustration of a console GUI for use in managing firmware for a group of user devices.

FIG. 3B includes a console screen 330 for selecting a target firmware version. This screen can list available firmware versions based on the enrolled devices in the system. In this example, the available firmware versions can be sorted based on OS. For example, the same console screen 330 can allow the administrator to select between WINDOWS and ANDROID operating systems, and separately select target firmware versions for each. In this example, the operating systems are separated by tabs 332 and 334. However, they can also be presented together in the same list. The administrator does not need to implement separate approaches to controlling firmware updates across the different operating systems. Instead, the console allows the administrator to handle targeting firmware versions and releasing updates in a consistent manner even when different operating systems are involved.

The firmware versions can also be sorted by release date 342, version identifier 344, OEM 346, device model 348, or cellular carrier 350. In one example, the administrator can select radio buttons 340 next to firmware versions to either approve or disapprove, depending on the example. These selections can comprise a target firmware version, in an example. More than one firmware version can be targeted at a time, in an example. The screen 330 can be provided for a group of enrolled devices, in an example. The group can be a subset of an enterprise, in an example. The selections can create target firmware versions for the group.

Figure 3C:
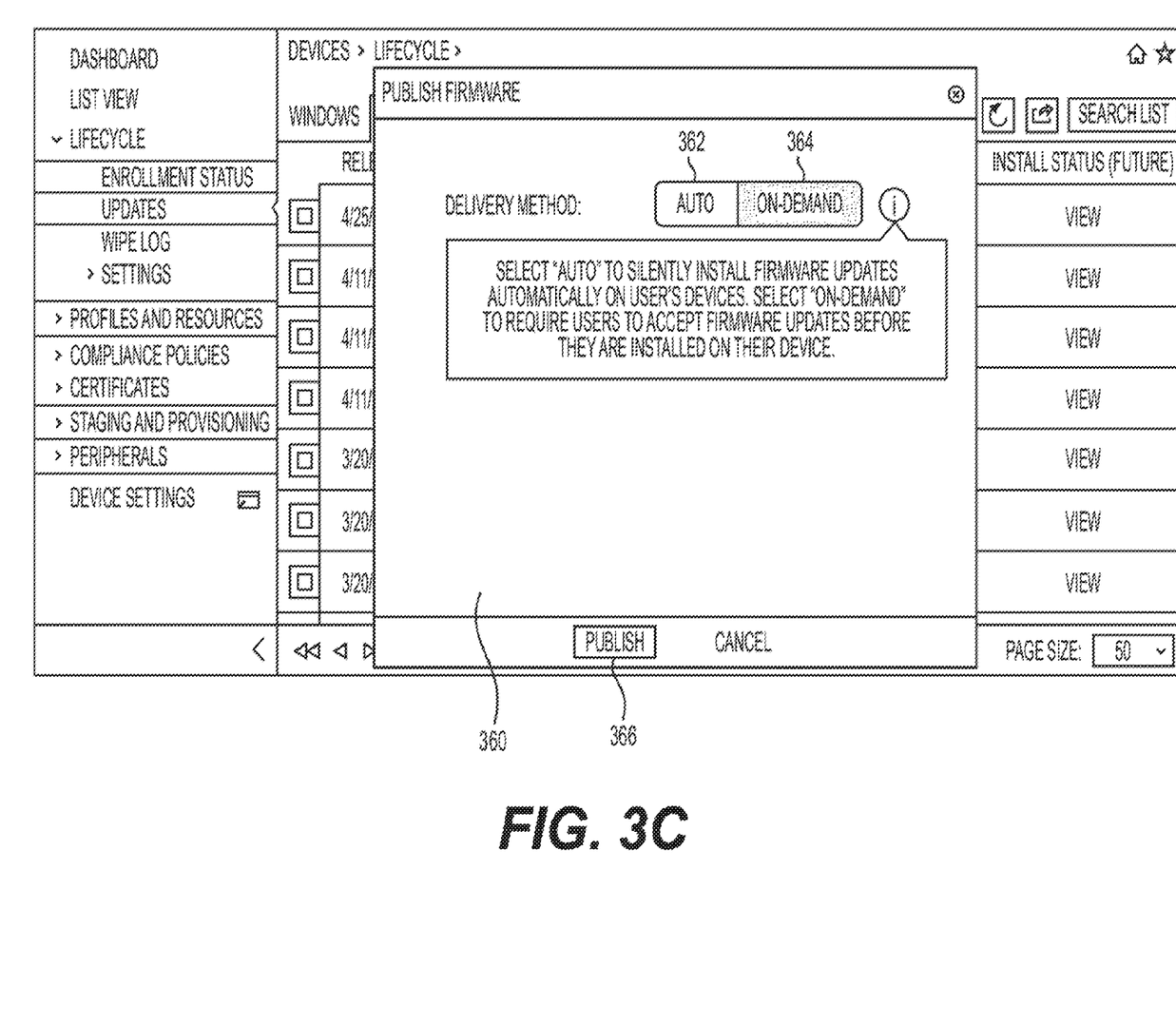
FIG. 3C is an exemplary illustration of a console GUI for use in managing firmware for a group of user devices.

FIG. 3C includes an additional console screen 360 for delivering the firmware update. The administrator can select between an automatic 362 or on-demand 364 installation. Other selections can include a calendar for when the target firmware versions should be published. When the administrator selects the "publish" button 366, the target firmware versions can be published to the group of devices under the chosen delivery method.

Figure 4:
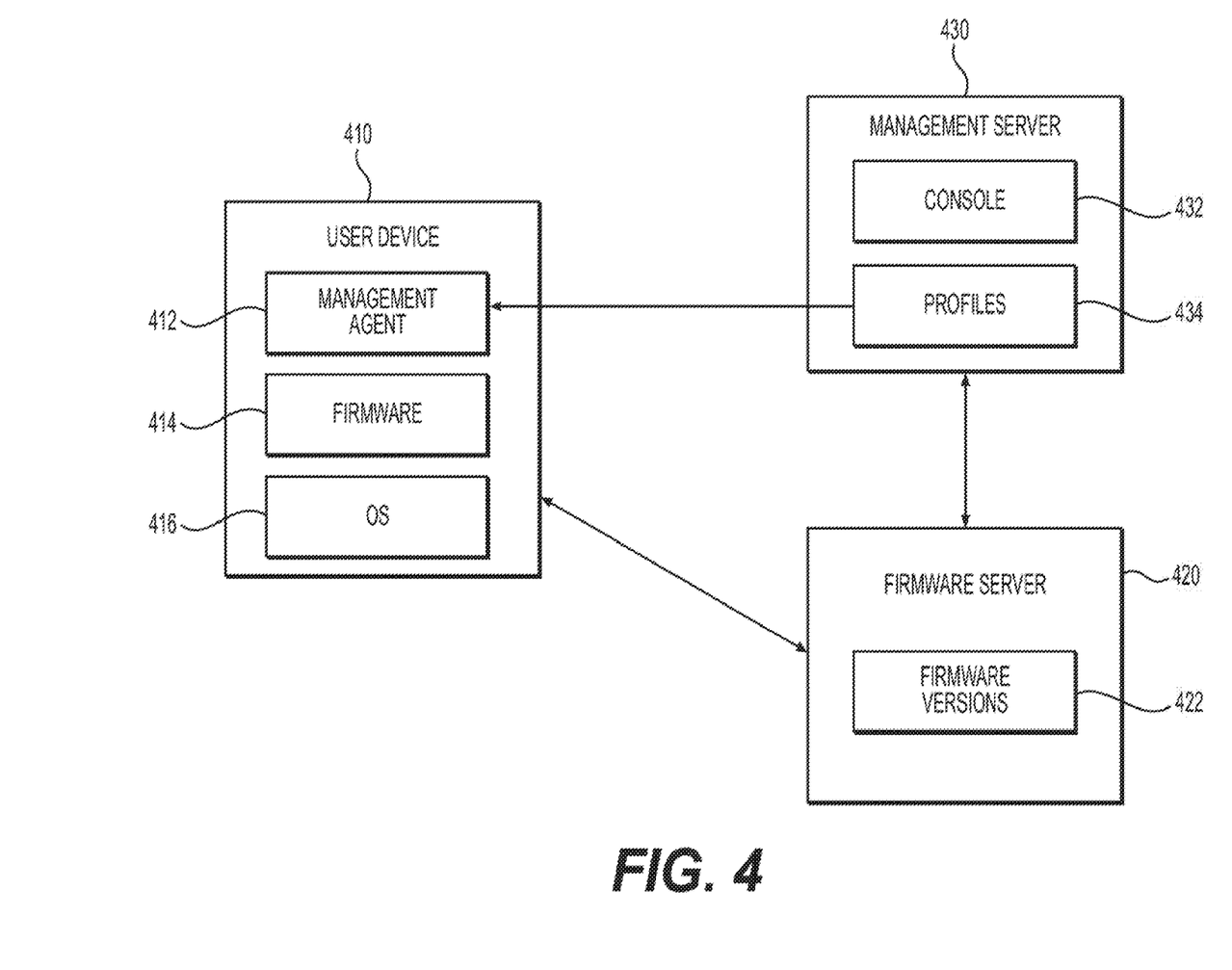
FIG. 4 is an exemplary illustration of system components for migrating a group of user devices associated with an enterprise from a first device-management service to a second device-management service.

FIG. 4 provides an exemplary illustration of system components for managing firmware updates on a group of user devices associated with an enterprise. The system can include a management server 430 that is maintained by an EMM provider. The management server 430 can be one or more servers that manage devices for a customer, such as an enterprise. Various devices can be assigned to members of the enterprise. The devices can be employee-owned devices or employer-owned devices. A device can include one or more processors, a memory store, and a display, and can connect to a wireless network. In the example of FIG. 4, user device 410 can be one such enrolled device. It can be a cell phone, laptop, tablet, or any other processor-based computing device.

The user device 410 can also execute firmware 414 and an OS 416. Examples discussed above can control which version of firmware 414 is installed on the user device 410. This can be based on the device model and the OS 416, in an example. The OS 416 can be WINDOWS, IOS, ANDROID, or another type of OS 416. The firmware 414 can come preinstalled on the user device 410, or can be downloaded and installed from the firmware server 420. The firmware server 420 can store or access storage of multiple firmware versions 422. Although a user device 410 would normally download and install the most recent of the firmware versions 422, examples described above allow an administrator to control which of the firmware versions 422 are installed as the firmware 414 at the user device 410.

Administrative control over the firmware 414 updates can require enrollment of the user device 410 in an EMM system. The user device 410 can enroll with the management server 430, in an example. Enrollment can allow the management server 430 to associate the user device 410 with a customer and control aspects of device functionality through use of a management agent 412.

The management server 430 can utilize a management agent 412 to control which firmware versions 422 can be installed at the user device 410. The management agent 412 can be installed during enrollment with the management server 430. For example, the management agent 412 can be downloaded from the management server 430 during or after enrollment.

Alternatively, the management agent 412 can be part of the OS 416 as an enterprise service. The enterprise service can allow the customer to exercise some degree of management control over the devices through interaction with the OS 416. The EMM provider can leverage the management agent 412 portion of the OS 416 by making API calls to the OS 416 or by causing a messaging server to do so. As an example, GOOGLE can provide enterprise support services through its ANDRIOD operating system (the services sometimes referred to as ANDRIOD FOR WORK). However, the enterprise service is not limited to any particular service, company, operating system, or manufacturer.

The management agent 412 can read a profile 434 to block the user device 410 from making firmware 414 updates. The profile 434 can include one or more commands sent from the management server 430 to the user device 410 based on administrative selections made on a console 432. The console 432 can be a GUI provided to access backend features of the EMM system. The console 432 can provide selection options for picking which devices should execute which firmware versions 422.

The profile 434 for the first user device 410 can be different than profiles of other enrolled user devices. The profile can include a target firmware version 422. The administrator can identify one or more target firmware versions 422 that can be downloaded and installed at the user device 410 based on the characteristics or organizational group of that user device 410.

As described previously, the management server 430 can request identification of the possible firmware versions 422 from the firmware server 420. The firmware server 420 can identify the firmware versions 422 based on the device models and operating systems 416 of the enrolled user devices.

The management server 430 can first register with the firmware server 420. This can include supplying information that allows the firmware server 420 to authenticate the EMM provider. In return, the management server 430 can receive a credential for use in authenticating itself with the firmware server 420.

The firmware server 420 can receive identification of the enrolled devices, including the user device 410. In one example, this is accomplished by the management server 430 providing the credential to the user device 410, which the user device 410 uses to register at the firmware server 420. The management agent 412 can use the profile 434 to contact the firmware server 420 for registration. This can include communicating with a URL in the profile, using the credential, and providing a user device identifier. The user device identifier can be included in the profile 434 from the management server 430.

This can allow the firmware server 420 to cease pushing firmware updates to the user device 410 until instructed by either the user device 410 or the management server 430. Likewise, based on the profile 434, the management agent 412 can restrict the user device 410 from contacting the firmware server 420 until instructed to do so by the management server 430. This can allow the administrator to use the console 432 to determine which firmware versions 422 to install, and when to install them. It can further allow the administrator to select whether the firmware versions 422 are pushed to the user devices 410 automatically or, alternatively, on demand by users of the user devices 410.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for managing firmware versions, the method comprising:
    processing a profile received by a user device from a management server, the profile including a restriction payload that comprises a corporate identifier and a flag that enables or disables a firmware update function for the user device;
    identifying a current firmware version of the user device;
    comparing the current firmware version to a profile-specified firmware version;
    performing, in an instance where the current firmware version is the same as the profile-specified firmware version, a series of processes including:
    transmitting an identity of the current firmware version to the management server,
    disabling the firmware update function of the user device by making an Application Programming Interface (API) call to a firmware server in response to determining that the flag in the profile's restriction payload specifies disabling the firmware update function, the API call including the corporate identifier and setting the current firmware version as a target firmware version, and causing the user device to register with the firmware server; and causing, in an instance where the firmware update function is re-enabled, the user device to communicate with one of the management server and the firmware server to obtain a target firmware version for updating the current firmware version based on the profile.

2. The method of claim 1, further comprising causing the user device to:
    display a user prompt seeking user permission to install the target firmware version; and
    request the target firmware version from the firmware server by implementing an application programming interface call specified in the profile.

3. The method of claim 1, further comprising receiving the target firmware version at the user device from the firmware server in an instance where the user device is registered with the firmware server.

4. The method of claim 1, further comprising causing the user device to impose a restriction on re-enabling the firmware update function that includes requiring an administrative approval.

5. The method of claim 1, wherein registering with the firmware server includes an application programming interface ("API") call from the user device to the firmware server, the API call including a credential specified in the profile.

6. The method of claim 1, further comprising:
    installing the target firmware version in place of the current firmware version; and
    reporting the installation of the target firmware version to the management server.

7. The method of claim 1, wherein disabling the firmware update function of the user device includes disabling the firmware update function until a target date.

8. A non-transitory, computer-readable medium comprising instructions that, when executed by a processor, perform stages for managing firmware versions, the stages comprising:
    processing a profile received by a user device from a management server, the profile including a restriction payload that comprises a corporate identifier and a flag that enables or disables a firmware update function for the user device;
    identifying a current firmware version of the user device;
    comparing the current firmware version to a profile-specified firmware version;
    performing, in an instance where the current firmware version is the same as the profile-specified firmware version, a series of processes including:
    transmitting an identity of the current firmware version to the management server,
    disabling the firmware update function of the user device by making an Application Programming Interface (API) call to a firmware server in response to determining that the flag in the profile's restriction payload specifies disabling the firmware update function, the API call including the corporate identifier and setting the current firmware version as a target firmware version,
    and causing the user device to register with the firmware server; and
    causing, in an instance where the firmware update function is re-enabled, the user device to communicate with one of the management server and the firmware server to obtain a target firmware version for updating the current firmware version based on the profile.

9. The non-transitory, computer-readable medium of claim 8, the stages further comprising causing the first user device to:
    display a user prompt seeking user permission to install the target firmware version; and
    request the target firmware version from the firmware server by implementing an application programming interface call specified in the profile.

10. The non-transitory, computer-readable medium of claim 8, the stages further comprising the user device receiving the target firmware version at the user device from the firmware server in an instance where the user device is registered with the firmware server.

11. The non-transitory, computer-readable medium of claim 8, the stages further comprising causing the user device to impose a restriction on re-enabling the firmware update function that includes requiring an administrative approval.

12. The non-transitory, computer-readable medium of claim 8, wherein registering with the firmware server includes an application programming interface ("API") call from the user device to the firmware server, the API call including a credential specified in the profile.

13. The non-transitory, computer-readable medium of claim 8, the stages further comprising:
    installing the target firmware version in place of the current firmware version; and
    reporting the installation of the target firmware version to the management server.

14. The non-transitory, computer-readable medium of claim 8, wherein disabling the firmware update function of the user device includes disabling the firmware update function until a target date.

15. A system for managing firmware versions for a group of user devices, comprising:
    a memory storage including a non-transitory, computer-readable medium comprising instructions; and
    a user device including a processor that executes the instructions to carry out stages comprising:
    processing a profile received by a user device from a management server, the profile including a restriction payload that comprises a corporate identifier and a flag that enables or disables a firmware update function for the user device;
    identifying a current firmware version of the user device;
    comparing the current firmware version to a profile-specified firmware version;
    performing, in an instance where the current firmware version is the same as the profile-specified firmware version, a series of processes including:
    transmitting an identity of the current firmware version to the management server, disabling the firmware update function of the user device by making an Application Programming Interface (API) call to a firmware server in response to determining that the flag in the profile's restriction payload specifies disabling the firmware update function, the API call including the corporate identifier and setting the current firmware version as a target firmware version, and causing the user device to register with the firmware server; and
    causing, in an instance where the firmware update function is re-enabled, the user device to communicate with one of the management server and the firmware server to obtain a target firmware version for updating the current firmware version based on the profile.

16. The system of claim 15, the stages further comprising causing the first user device to:
    display a user prompt seeking user permission to install the target firmware version; and request the target firmware version from the firmware server by implementing an application programming interface call specified in the profile.

17. The system of claim 15, the stages further comprising receiving the target firmware version at the user device from the firmware server in an instance where the user device is registered with the firmware server.

18. The system of claim 15, further comprising causing the user device to impose a restriction on re-enabling the firmware update function that includes requiring an administrative approval.

19. The system of claim 15, wherein registering with the firmware server includes an application programming interface ("API") call from the user device to the firmware server, the API call including a credential specified in the profile.

20. The system of claim 15, that stages further comprising:
- installing the target firmware version in place of the current firmware version; and
- reporting the installation of the target firmware version to the management server.

\* \* \* \* \*